United States Patent [19]

Blais et al.

[11] 4,262,256
[45] Apr. 14, 1981

[54] ENERGY EXTRACTION SYSTEM FROM A CAPACITIVE SOURCE WITH SHUNT SWITCHING REGULATION

[75] Inventors: René Blais, Boucherville; Raymond Berthiaume, Ste-Julie; Marcel Dery, Varennes, all of Canada

[73] Assignee: Hydro-Quebec, Montreal, Canada

[21] Appl. No.: 915,964

[22] Filed: Jun. 15, 1978

[51] Int. Cl.³ .............................................. G05F 1/44
[52] U.S. Cl. ...................................... 323/223; 323/243
[58] Field of Search .................. 323/8, 24, 34, 62, 74, 323/81, 93; 361/107

[56] References Cited

U.S. PATENT DOCUMENTS

| | | | |
|---|---|---|---|
| 1,816,717 | 7/1931 | Belt | 307/151 |
| 3,259,762 | 7/1966 | Skuderna | 361/107 X |
| 3,507,096 | 4/1970 | Hall et al. | 323/24 X |
| 3,579,088 | 5/1971 | Fletcher et al. | 323/81 X |
| 3,609,515 | 9/1971 | Babcock et al. | 323/62 X |
| 3,743,921 | 7/1973 | Legg et al. | 323/24 X |
| 3,815,015 | 6/1974 | Swin et al. | 323/8 X |
| 3,882,373 | 5/1975 | Brenig | 323/66 |
| 3,914,685 | 10/1975 | Van Gilder | 323/20 |
| 3,955,134 | 5/1976 | Woodford | 323/81 X |
| 4,068,157 | 1/1978 | Bassett | 323/24 X |

FOREIGN PATENT DOCUMENTS

| | | |
|---|---|---|
| 2033679 | 2/1971 | Fed. Rep. of Germany . |
| 545259 | 10/1922 | France . |
| 2020069 | 10/1970 | France . |

OTHER PUBLICATIONS

"Elektrostatische Inductie Als Voedingsbron", Polytechnisch Tijdschrit, Sep. 1964, vol. 19E, pp. 657–659.
Gessen et al., "Transformator Für Kapazitive Leistungsentnahme Aus Hochspannungsleitungen", Elektrotechnik, vol. 7, No. 6 Jun. 1953, pp. 255–259.
"Capacitor Bank Used to Power Remote Loads Can Be a Headache", Electrical World, vol. 175, No. 10, May 15, 1971, pp. 48, 49.

Primary Examiner—A. D. Pellinen
Attorney, Agent, or Firm—Schwartz, Jeffery, Schwaab, Mack, Blumenthal & Koch

[57] ABSTRACT

A system for and a method of extracting energy from a capacitive source, for example the energy induced in an insulated section of the overhead wire of an AC transmission line. The energy is extracted from the overhead wire by tapping the primary winding of a voltage step-down transformer which develops at its secondary an AC voltage the value of which is regulated through shunt switching. The shunt switching regulation as such is achieved by power thyristors the firing of which is selectively controlled in accordance with the phase and the amplitude of the output voltage. A comparator is used to compare the output voltage value with that of a signal delivered by an internal ramp generator. Moreover, the firing instant of the thyristors is governed by the output signal of the comparator and also in function of the information on the polarity of the output voltage cycles. Such shunt switching regulation allows the extraction from the overhead wire a maximum of power per kilometer of insulated wire and ensures a high stability of the output voltage despite substantial variations in the load connected to the secondary of the step-down transformer. The instant extracting system allows inter alia an economic and steady supply of power to microwave repeater stations which usually run along energy transmission lines and remote from central supply sources.

26 Claims, 9 Drawing Figures

ENERGY EXTRACTION SYSTEM FROM A CAPACITIVE SOURCE WITH SHUNT SWITCHING REGULATION

BACKGROUND OF THE INVENTION

The present invention relates to a method of and a system for extracting electrical energy embodied in a capacitive source and concerns more particularly a method of and a system for tapping the electrical energy from the overhead wires of AC power transmission lines.

The presence of electrical energy in the overhead wires of high AC voltage transmission lines has been well known for several years as yet. The tapping of that energy, particularly at remote locations, offers numerous advantages, but technological problems, such as the saturation of the transformers used, have hitherto delayed an economical and reliable extraction of that energy.

The object of the present invention resides in a system and a method which permit to harness such available power from the overhead wires of AC transmission lines. The harnessing of that power presents many advantages and provides for a large number of applications one of which resides in feeding the microwave communication networks usually disposed along lengthy transmission lines. At the present time, the communication and data transmission stations are supplied in power by means of diesel type generators, due to their physical remoteness, which show numerous disadvantages in terms of maintenance, reliability and supply in fuel.

As known in the technique, the overhead wire is that conductor hung up at the head of the pylons supporting the high voltage conductor bundles and which normally acts as a lightning arrester for power transmission lines. That wire is therefore grounded against earth and is not used to convey electrical energy. However, due to its proximity to the bundles of conductors, a certain amount of energy is induced in that wire through capacitive coupling.

The purpose of the present invention is directed to the tapping of that AC energy induced in the overhead wires capacitively coupled to the bundles of conductors of AC voltage transmission lines.

SUMMARY OF THE INVENTION

The extraction system according to the present invention comprises a device for transforming the energy tapped from the capacitive source so as to provide an AC output voltage; and regulating means mounted in shunt on the transforming device and on the system output to control effectively the output power.

The present invention also relates to an energy extracting method carried on by the above-described system. This method mainly consists of insulating a predetermined length of an overhead wire, extracting the energy induced in the insulated segment of that overhead wire by means of a voltage step-down device and regulating through shunt switching the output power of the voltage step-down device.

BRIEF DESCRIPTION OF THE DRAWINGS

A preferred embodiment of the present invention will be described hereinafter with reference to the accompanying drawings, wherein.

DETAILED DESCRIPTION OF THE PREFERRED EMBODIMENT

Figure 1:
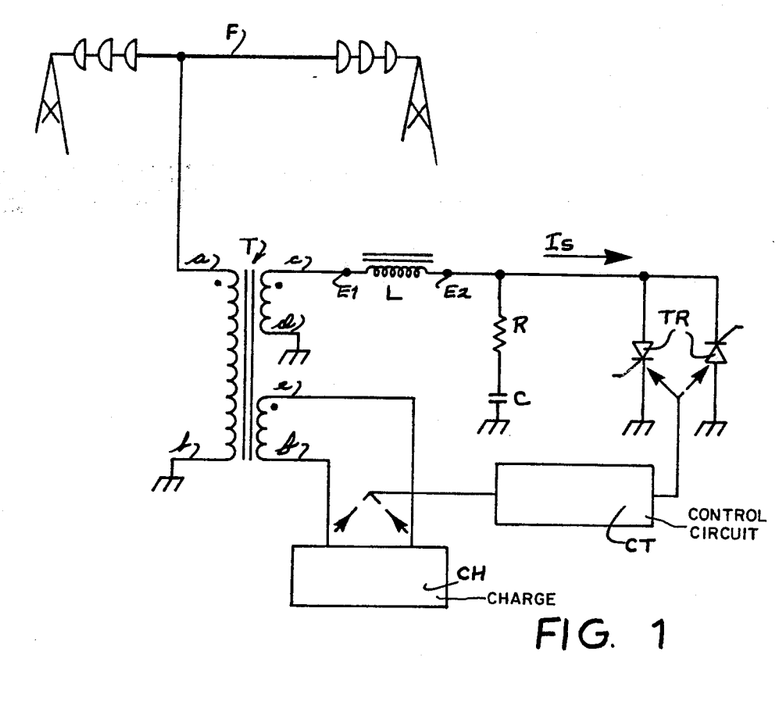
FIG. 1 schematically illustrates an extraction system provided with shunt switching regulation to tap energy from an overhead wire of an AC transmission line, in accordance with the present invention.

FIG. 1 schematically shows the arrangement of the system for extracting and regulating the energy induced in the overhead wire F, a predetermined length of which being insulated, by a bundle of electrical conductors of a very high AC voltage transmission line. Due to its very high impedance, such a supply source through the overhead wire or capacitive source is similar to a current source. That current feeds the primary winding of a voltage step-down transformer T having a terminal A connected to the overhead wire and a terminal B grounded. A useful load CH is connected across the low voltage secondary winding terminals e-f of transformer T. In order to regulate the power delivered to the load CH, a switching circuit is mounted in shunt on the secondary of the transformer, between the output e-f and the medium voltage secondary winding terminals c-d. Shunt switching is achieved through power thyristors TR mounted top to bottom, the firing of each being selectively controlled by the control circuit CT coupled to the transformer output e-f. An RC circuit is powerly mounted with the thyristor TR to dampen or filter the transient waves generated during the switching of either one of the thyristors. A smoothing inductance L is serially connected between the secondary winding c-d and the power switching circuit per se in order to limit the peak switching currents through the secondary of the transformer T.

It is to be noted that the device used to transform the energy extracted from the capacitive source or the overhead wire may as well be a transformer of the insulation type or of the voltage step-up type in lieu of the above-described one, as the case may be, its function remaining wholy unchanged.

Figure 2A:
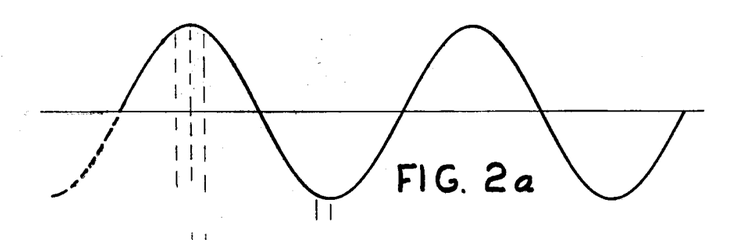
FIGS. 2a to 2e show waveforms of the circuit of FIG. 1.
Figure 2B:
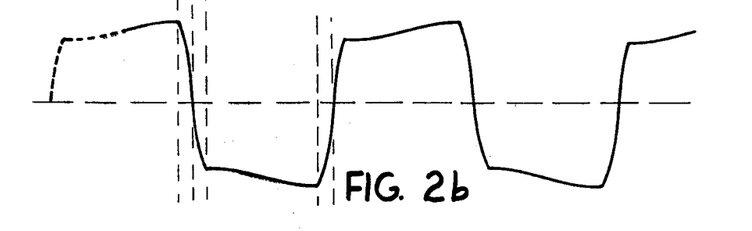
Figure 2C:
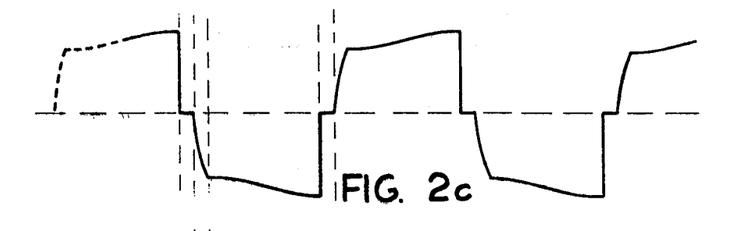
Figure 2D:
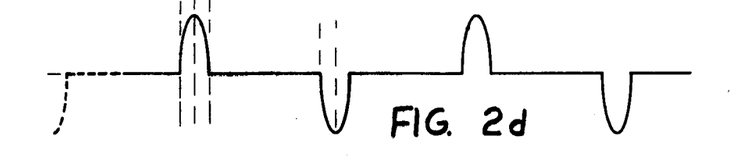
Figure 2E:
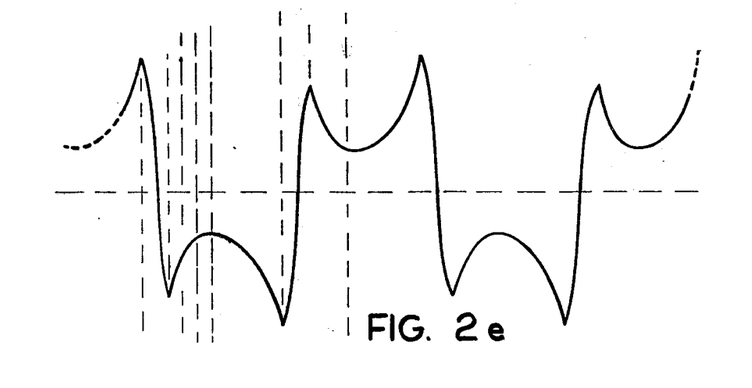

FIGS. 2a to 2e show voltage and current waveforms useful in explaining the operation of the system of FIG. 1. FIG. 2a shows the voltage sinusoidal wave developed on the overhead wire when there is no load and without any power regulator; FIG. 2b is the waveform obtained in $E_1$ when the system operates at full load, whereas FIG. 2c shows that in $E_2$ also at full load. FIG. 2d depicts the current waveform IS at switching time and whose direction varies whether one or the other of the thyristors TR is conductive; and FIG. 2e shows the voltage in $E_1$ when the system works with no load. At full load, the firing of thyristors TR is effected at the peak of the sinusoid of FIG. 2a and one of the thyristors is rendered conductive to create across the terminals of the smoothing inductance L a voltage, and a current IS is flowing. An equivalent L-C circuit is then formed while the value of C is that of the reflected capacitance from the overhead wire, which creates the waveform for current IS of FIG. 2d. As known, in an inductance, the current is always 90° degrees out of phase with respect to the voltage so that $E_1$ and $E_2$ (FIGS. 2b and 2c, respectively) cross a zero point voltage when the current IS is at maximum. Thereafter, the voltage across the terminals of the inductance L is reversed and the current IS returns to a nul value; one of the thyristors TR is blocked and the voltage $E_1$ has an amplitude equal to that preceding the firing of the thyristor, less the losses, but of a reversed polarity. At this instant, the capacitive energy of the overhead wire compensates the previously encountered losses in addition to supplying the power required by the load. The voltage at $E_1$ and $E_2$ has then a waveform similar to a portion of sinusoid coincidentally occurring in time with that shown in FIG. 2a, and this until the next firing of thyristors TR. This firing occurs at the peak of the next cycle of the voltage of FIG. 2a to produce a waveform similar to that of the preceding cycle, but of reversed polarity. It is to be noted that such regulation allows to obtain a waveform having symmetrical cycles.

The regulator arrangement permits not only to insure the symmetry of the output voltage waveform but also to compensate any variation in the output load. Indeed, in the occurrence of a decrease in the output load, the compensating action of the capacitive source, the overhead wire, will also have to decrease so as to keep constant the main value of the output voltage. With this in view, the firing of the thyristors is advanced in time which is apparent from a comparison of the waveforms of FIGS. 2b and 2e with that of FIG. 2a. Indeed, due to the capacitive nature of the source, the coupling of the energy to the load is always proportional to the first derivative of the voltage, DV/DT, of the source while taking into account the polarity of the latter. Thus, when the firing of either one of the thyristors is effected at the start of the cycle, the power available to the load becomes less due to the change in polarity of DV/DT at the peak of the sinusoidal waveform. Also, it is noted that the amplitude of the voltage in $E_1$, with no load (FIG. 2e), presents major differences resulting in a lesser attenuation in the energy from the capacitive source.

Figure 3:
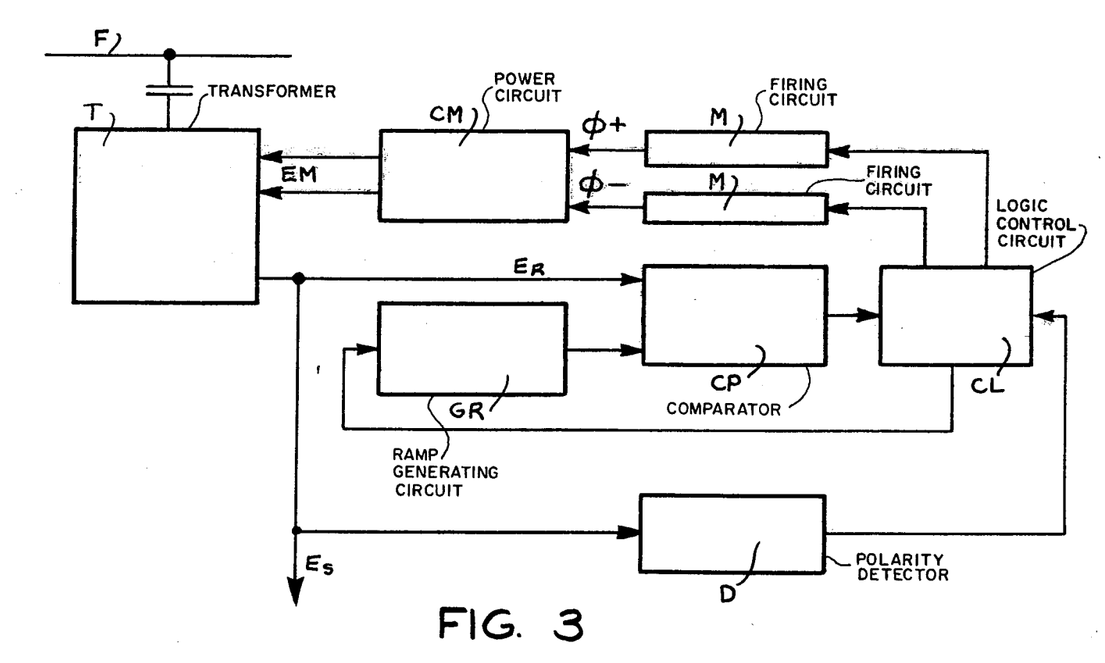
FIG. 3 is a block diagram of the system illustrated in FIG. 1.

FIG. 3 illustrates in block diagram the principal circuits forming the shunt switching regulation system. The voltage step-down transformer T, having its primary winding connected to the overhead wire F, supplies an output voltage ES through one of the secondary windings whereas a voltage EM is created through the terminals of the other secondary winding, the latter being the one by which the output power regulation is achieved. This regulation system mounted in shunt with the transformer secondary comprises a comparator CP fed by a reference signal ER and a ramp generator GR, and which delivers a signal to the logic control circuit CL to command the firing circuits M of the thyristors forming the power circuit CM. That comparator CP defines the instant of firing of the thyristors in function of the value of the ramp generated by circuit GR which is locked in phase with the capacitive source F and in relationship to the output voltage ES of the system. When initiated by the comparator CP and according to the phase and the information supplied by the polarity detector D, the control circuit CL determines which one of the firing circuits M will be energized. These firing circuits M serve in fact to relate the low voltage and medium power circuits to the high voltage and large current thyristors used in the switching circuit CM.

Figure 4:
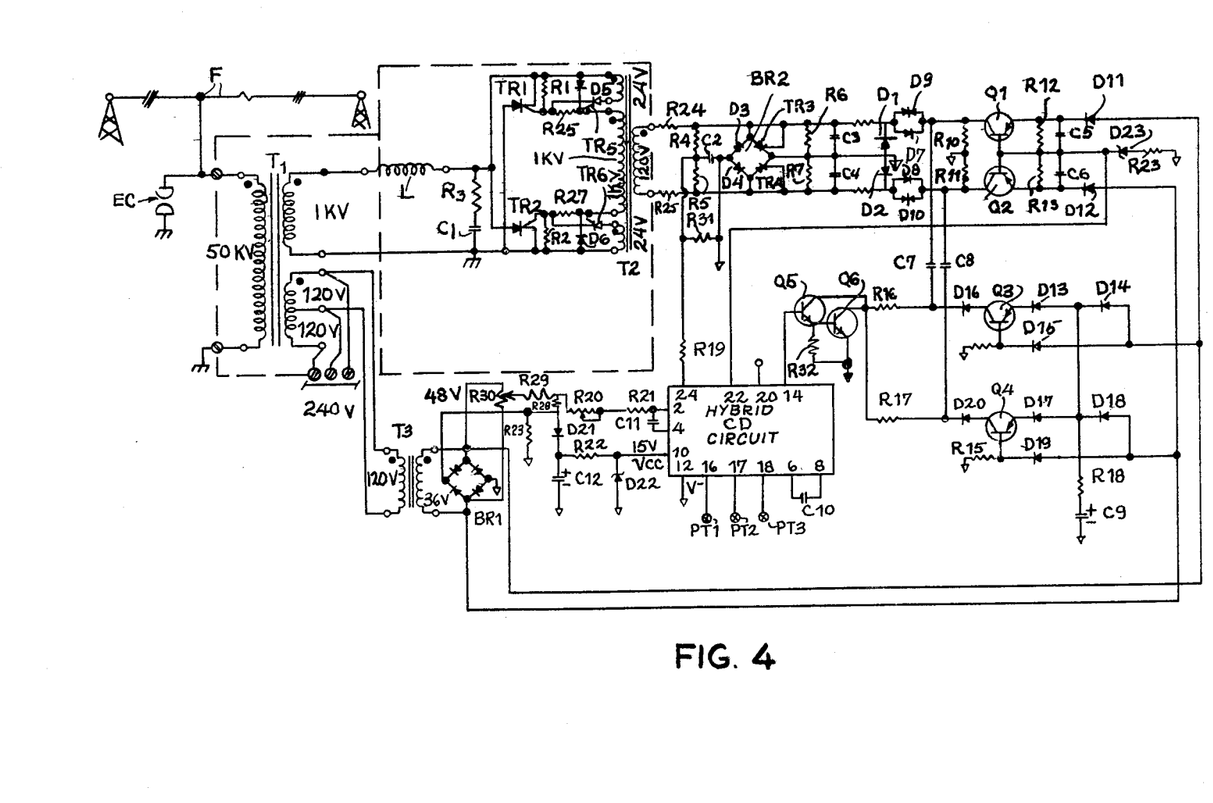
FIG. 4 depicts in detail the components used to form the extraction and regulation system of FIG. 3.

FIG. 4 gives details of the extraction system with shunt switching regulation of FIG. 3. The energy from the overhead wire F is coupled, through the voltage step-down transformer $T_1$, to the useful load connected to the secondary winding of 240 VAC, which comprises a central tap, and to the power switching circuits per se via the secondary winding of 1 kVAC.

From the central tap of the 240 VAC secondary winding, the regulation system is supplied with the voltage by means of the voltage step-down transformer $T_3$, the diode bridge $BR_1$, diode $D_{21}$, capacitor $C_{12}$, resistance $R_{22}$ and zener diode $D_{22}$, on the one hand, and information on the amplitude in the phase of the capacitive source F is provided to the comparator circuit. This information is drawn at the level of rheostat $R_{30}$ which is mounted in shunt with the secondary of the transformer $T_3$, and the resistances $R_{28}$, $R_{29}$ and $R_{23}$ through resistances $R_{20}$ and $R_{21}$ as well as the capacitor $C_{11}$. Rheostat $R_{30}$ equalizes the voltage levels produced by the positive and negative cycles, this in order to correct any error in asymmetry in the system. Potentiometer $R_{20}$ is used to adjust the level of the input signal to the integrator formed by resistances $R_{20}$ and $R_{21}$ and capacitor $C_{11}$ so as to fix the output feeding the external load at the desired level of 240 VAC.

At the moment where the ramp generated by the integrator circuit reaches the required level, the hybrid circuit CD delivers a firing pulse through the output 22. That pulse is conveyed towards the trigger electrode of thyristor $TR_3$ or $TR_4$ by the transistor $Q_1$ or $Q_2$. The setting in conduction of transistor $Q_1$ and $Q_2$ is governed by the polarity of the signal feeding diodes $D_{11}$ and $D_{12}$ connected to transformer $T_3$. Furthermore, diodes $D_9$ and $D_{10}$ as well as capacitors $C_3$ and $C_4$ and immunity against noise so as to prevent any erroneous firing of thyristors $TR_3$ and $TR_4$. Conduction of either one of thyristors $TR_3$ and $TR_4$ in the diode bridge $BR_2$ provokes a short-circuit in the 120 VAC winding of transformer $T_2$ through diodes $D_3$ or $D_4$ and current limiting resistances $R_{24}$ or $R_{25}$, according to the case. That short-circuit is then reflected to the other windings of the transformer $T_2$ and permits the actuation of the power thyristors $TR_1$ or $TR_2$ via thyristors $TR_5$ or $TR_6$, respectively, according to the information on the polarity supplied by the transformer $T_3$ and the diodes $D_{11}$ and $D_{12}$. Thyristor $TR_1$ or $TR_2$ being conductive, a current the transients of which are filtered by capacitor $C_1$ and resistance $R_3$, flows through the coil L and the 1 kVAC winding, as indicated in the description of FIG. 1. Such short-circuiting of transformer $T_2$ also generates a reset signal towards the integrator formed by resistances $R_{20}$ and $R_{21}$ and capacitor $C_{11}$ via resistance $R_{19}$ and circuit CD.

Furthermore, an auxiliary circuit is provided to prevent a loss of synchronism of the system, which could occur at the starting time or when the external load exceeds the nominal capacity of the regulator. That auxiliary circuit is generally formed by transistors $Q_3$, $Q_4$, $Q_5$ and $Q_6$ and capacitors $C_7$, $C_8$ and $C_9$. In the event of a positive cycle at diodes $D_{18}$ and $D_{19}$, capacitor $C_9$ is charged through resistance $R_{18}$, but transistor $Q_4$ is blocked, its emitter being more negative than its base. However, when the positive cycle starts decreasing, transistor $Q_4$ enters in conduction and a positive pulse passes to thyristor $TR_4$ through capacitor $C_8$, thereby initiating the firing of one of the power thyristors $TR_1$ or $TR_2$ at an angle corresponding to the maximum power of the system. The same process is performed for the other cycle, through transistor $Q_3$ and capacitor $C_7$. As to transistors $Q_5$ and $Q_6$, they allow the recharging of capacitors $C_7$ and $C_8$ after a reset time fixed by capacitor $C_{10}$ connected to terminals 6 and 8 of the hybrid circuit CD.

On the other hand, in order to ensure the protection function normally assigned to the overhead wire with respect to the energy transmission line, there is provided a lightning-arrester EC of the spark-gap type operating at 100 kV peak shunting the primary winding of transformer $T_1$. Moreover, the regulator itself is protected against any impulse from the overhead wire, due to lightnings or overvoltages, by the circuit formed by the zener diode $D_{23}$ and the resistance $R_{23}$. In the latter case, any overvoltage is directed to transformer $T_3$ and to diodes $D_{11}$ and $D_{12}$ to actuate the zener diode $D_{23}$, which results in turning on transistors $Q_1$ or $Q_2$ and thereafter one of the power thyristors $TR_1$ or $TR_2$.

Figure 5:
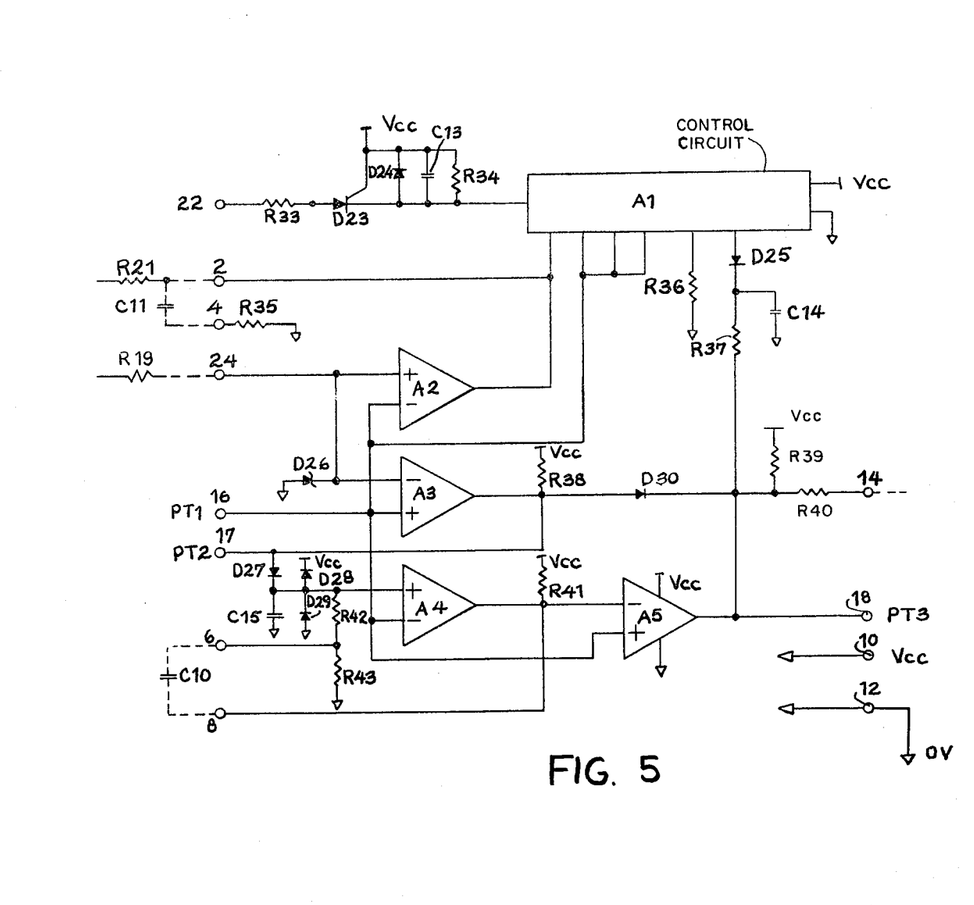
FIG. 5 illustrates a detailed electrical diagram of the hybrid circuit used in FIG. 4.

FIG. 5 illustrates one embodiment of the hybrid circuit CD of FIG. 4. This hybrid circuit is mainly formed of a control circuit $A_1$, in the integrated form, and of the type CA723H manufactured by RCA, for example. The hybrid circuit governs the delivery time of a powering signal through terminal 22 via thyristor $D_{23}$ and its related components, which are the resistances $R_{33}$ and $R_{34}$, the diode $D_{24}$ and the capacitor $C_{13}$. This firing signal is delivered by the control circuit $A_1$ when the ramp generated by the integrator formed by resistance $R_{21}$ and capacitor $C_{11}$ through terminals 2 and 4, reaches a predetermined value, that ramp being controlled in phase at the output of transformer $T_1$ (FIG. 4). The reset signal from resistance $R_{19}$ through terminal 24 acts on the integrator connected at terminals 2 and 4 by means of the differentiator $A_2$ when the firing of thyristors $TR_3$ or $TR_4$ (FIG. 4) is effected. That reset signal from terminal 24 also feeds differentiator $A_3$ connected to a zener diode $D_{26}$. On the other hand, a signal to recharge capacitors $C_7$ and $C_8$ (FIG. 4) is delivered by the control circuit $A_1$ through diode $D_{25}$, capacitor $C_{14}$ and resistances $R_{37}$, $R_{39}$ and $R_{40}$, via terminal 14 of the hybrid circuit, and in accordance with a reset time determined by capacitor $C_{10}$, shunting terminals 6 and 8, resistances $R_{42}$ and $R_{43}$, differentiator $A_5$ and resistance $R_{40}$. In addition, checking and testing terminals $PT_1$, $PT_2$ and $PT_3$ are provided to verify the proper operation of the system. Those checking terminals are coupled to the control circuit $A_1$ and to the output terminal for the firing and reset signals, through the differentiators $A_2$, $A_3$, $A_4$ and $A_5$ so as to allow a general investigation at will of the adequate operation of the regulation and power switching systems.

The above-described extraction system with shunt switching regulation has been tested on a 735 kVAC power transmission line. A 4 km section of the overhead wire associated with that line has been insulated against earth. The output power of that system was then of 20 kW, that is 5 kW per kilometer of overhead wire insulated, which is indeed a mark result. Moreover, owing to that system, it was noted that the variations in the output voltage, at full load and no load which represents extreme cases of operation, were rather trivial, being less than ±2% in all cases.

It is to be understood that modifications in the system for extracting the energy in an overhead wire incorporating a system for regulating the output voltage, in accordance with the preferred embodiments described above, may be drawn without hampering the gist of the present invention the scope of which is limited only by the claims that follow.

We claim:
1. A system for extracting the energy induced through a capacitive coupling in an overhead wire by the conductors of an AC transmission line, said system having an output and comprising:
    a voltage step-down device for transforming said energy induced in the overhead wire into an output AC voltage at said system output; and
    regulation means, mounted in shunt with said voltage step-down device, for regulating said output AC voltage, said regulation means comprising switching means comprising firable switching elements coupled to the voltage step-down device, an inductance serially mounted between the switching means and the voltage step-down device, a control circuit responsive to the phase and the amplitude of the output AC voltage to control said switching means,
    a detecting circuit including a voltage polarity detector connected between the system output and said control circuit, said voltage polarity detector including means for detecting the phase and the amplitude of said output AC voltage and for delivering a reference signal to said control circuit when the amplitude of said output AC voltage is of a predetermined value and the polarity of said output AC voltage is of a predetermined polarity said detecting circuit further comprising ramp generating means operative in accordance with the phase of said output AC voltage, said ramp generating means and said polarity detector feeding said control circuit for firing said switching elements.

2. A system as claimed in claim 1, wherein said voltage step-down device comprises a transformer having a primary winding connected to said overhead wire and two secondary windings, said output AC voltage being delivered through one of the secondary windings and said regulation means connected to the other of said secondary windings and coupled through said control circuit to the system output.

3. A system as claimed in claim 1, characterized in that the control circuit comprises a circuit for delivering a reset signal to said ramp generating means.

4. A system as claimed in claim 1, said system further comprising means for ensuring symmetry of the positive and negative cycles of said output AC voltage said means for ensuring symmetry being coupled between the system output and said ramp generating means.

5. A system as claimed in claim 1, characterized in that an auxiliary circuit actuates firing of said switching elements at a maximum angle when the power required by the output exceeds a nominal capacity of said system.

6. A system for extracting the energy induced in an overhead wire by the conductors of a power transmission line, through capacitive coupling, said system having an output and comprising:
    a voltage step-down transformer having a primary winding connected to said overhead wire and two secondary windings, one of said secondary windings supplying an output AC voltage at said system output; and
    means for regulating said output AC voltage, said regulating means including switching means coupled to the other of said secondary windings of the transformer, a smoothing inductance serially connected between the switching means and said other of said secondary windings and a control circuit for firing said switching means, said control circuit comprising means for detecting the amplitude of said output AC voltage; a circuit for adjusting the symmetry between the positive and negative cycles of said output AC voltage; a ramp generating circuit connected to the output of said symmetry adjusting circuit; and a circuit connected to the ramp generating circuit for controlling selectively the firing of said switching means in cooperation with a polarity detector coupled to the system output.

7. A system as claimed in claim 6, wherein said control circuit includes a circuit for resetting said ramp generating circuit.

8. A system as claimed in claim 6, wherein said control circuit includes means for firing said switching means at a maximum angle upon detection of an output power from the system exceeding a predetermined nominal output power value of the system.

9. A system as claimed in claim 6, including an overvoltage protection means for shunting the primary winding of said voltage step-down transformer during an overvoltage condition.

10. A system for extracting the energy from a capacitive source, said system having an output and comprising:
a transforming device for transforming said energy in said capacitive source into an output AC voltage at said system output, said transforming device comprising a transformer having two secondary windings, one of the secondary windings supplying said output AC voltage at said system output, and
regulation means connected in shunt with said transforming device and said system output, for regulating said output AC voltage, said regulation means being connected to the other of said secondary windings, said regulation means including firable switching elements,
coupled to the transforming device, an inductance serially connected between the switching elements and the transforming device, and a control circuit for said switching elements responsive to the phase and amplitude of said output voltage, said system further including detecting means, said detecting means comprising ramp generating means controlled by the phase of said output AC voltage, said ramp generating means feeding said control circuit for firing said switching elements.

11. A system as claimed in claim 10, wherein said control circuit includes a polarity detector for providing a polarity signal, and said system further includes means for detecting the phase and the amplitude of said output AC signal, said detecting means generating a reference signal to said control circuit, said control circuit delivering a control signal to said switching elements only when the reference signal is of a predetermined value and the polarity signal from the polarity detector is of a predetermined polarity.

12. A system as claimed in claim 10, wherein said control circuit comprises a circuit delivering a signal for resetting said ramp generating means.

13. A system as claimed in claim 10, further including means for ensuring symmetry of the positive and negative cycles of said output AC voltage, said means for ensuring symmetry being coupled between the system output and the ramp generating means.

14. A system as claimed in claim 10, further including an auxiliary circuit for actuating firing of said switching elements at a maximum angle when the power required by the output AC voltage exceeds a nominal capacity of said system.

15. A system for extracting the energy induced through a capacitive coupling in an overhead wire by the conductors of an AC transmission line, said system having an output and comprising:
(a) a voltage step-down device for transforming said energy induced in the overhead wire into an output AC voltage at said system output; and
(b) regulation means mounted in shunt with said voltage step-down device for regulating said output AC voltage, said regulation means comprising:
switching means consisting of two switching elements coupled top to bottom to the voltage step-down device,
an inductance means, serially mounted between the switching means and the voltage step-down device, for reversing the voltage polarity and alternately blocking each of the switching elements after it has been fired until firing of the other switching element,
a control circuit responsive to the polarity and amplitude of the output AC voltage for selectively commanding the firing of the switching means, said control circuit comprising means responsive to the phase of the output AC voltage and the polarity of each switching element for determining which one of said switching elements is to be fired.

16. A system as claimed in claim 15, wherein said regulation means further comprises a voltage polarity detector connected between the system output and the control circuit for delivering a polarity signal to the said control circuit, and means for detecting the phase and the amplitude of the output AC voltage and for delivering a reference signal to the control circuit, said control circuit firing the switching means only when the reference signal is of a predetermined value and the polarity signal from the polarity detector is of a predetermined polarity.

17. A system as claimed in claim 16, wherein said means for detecting the phase and amplitude of output AC voltage includes ramp generating means operative in accordance with the phase of said output AC voltage and a comparator serially mounted between the ramp generating means and the control circuit, said comparator defining the instant of firing of the switching means in function of the value of the ramp generated.

18. A system as claimed in claim 17, wherein said control circuit comprises a circuit delivering a signal for resetting said ramp generating means.

19. A system as claimed in claim 17, further including means for ensuring symmetry of the positive and negative cycles of said output AC voltage, said means for ensuring symmetry being coupled between the system output and the ramp generating means.

20. A system as claimed in claim 17, further including an auxiliary circuit for actuating firing of said switching elements at a maximum angle when the power required by the output AC voltage exceeds a nominal capacity of said system.

21. A system for extracting the energy induced through a capacitive coupling in an overhead wire by the conductors of an AC transmission line, said system having an output and comprising:

(a) a voltage step-down device for transforming said energy induced in the overhead wire into an output AC voltage at said system output; and (b) regulation means mounted in shunt with said voltage step-down device for regulating said output AC voltage, said regulation means comprising:

two-polarity switching means coupled to the voltage step-down device, an inductance means, serially mounted between the switching means and the voltage step-down device, for reversing the voltage polarity and alternately blocking the switching means in one polarity after it has been fired until firing thereof in the other polarity, and a control circuit responsive to the polarity and amplitude of the output AC voltage for commanding the firing of the switching means, said control circuit comprising means responsive to the phase of the output AC voltage and the polarity of the switching means for firing the same in one polarity and in the other polarity alternately.

22. A system as claimed in claim 21, wherein said regulation means further comprises a voltage polarity detector connected between the system output and the control circuit for delivering a polarity signal to the said control circuit, and means for detecting the phase and the amplitude of the output AC voltage and for delivering a reference signal to the control circuit, said control circuit firing the switching means only when the reference signal is of a predetermined value and the polarity signal from the polarity detector is of a predetermined polarity.

23. A system as claimed in claim 22, wherein said means for detecting the phase and amplitude of output AC voltage includes ramp generating means operative in accordance with the phase of said output AC voltage and a comparator serially mounted between the ramp generating means and the control circuit, said comparator defining the instant of firing of the switching means in function of the value of the ramp generated.

24. A system as claimed in claim 23, wherein said control circuit comprises a circuit delivering a signal for resetting said ramp generating means.

25. A system as claimed in claim 23, further including means for ensuring symmetry of the positive and negative cycles of said output AC voltage, said means for ensuring symmetry being coupled between the system output and the ramp generating means.

26. A system as claimed in claim 23, further including an auxiliary circuit for actuating firing of said switching elements at a maximum angle when the power required by the output AC voltage exceeds a nominal capacity of said system.

* * * * *

UNITED STATES PATENT AND TRADEMARK OFFICE
CERTIFICATE OF CORRECTION

PATENT NO. : 4,262,256
DATED : April 14, 1981
INVENTOR(S) : BLAIS, et al

It is certified that error appears in the above—identified patent and that said Letters Patent is hereby corrected as shown below:

In the bibliographical portion, line 75, please reverse the order of Inventors so as to read as follows:

--[75] Inventors: Raymond Berthiaume, Ste-Julie;
Rene Blais, Boucherville;
Marcel Dery, Varennes, all of Canada--

Signed and Sealed this

Eleventh Day of August 1981

[SEAL]

Attest:

Attesting Officer

GERALD J. MOSSINGHOFF

Commissioner of Patents and Trademarks